Oct. 11, 1932.  G. W. JANSON ET AL  1,881,622
SYSTEM FOR TESTING AND RECORDING THE CONDITION OF CLOCK SETTING CIRCUITS
Filed Feb. 5, 1930  6 Sheets-Sheet 5
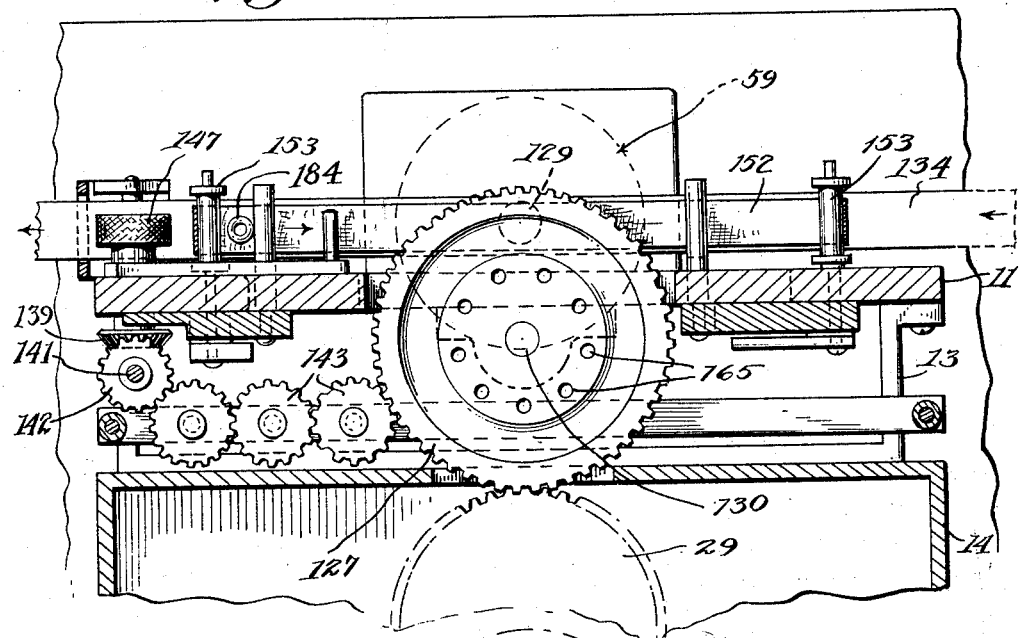
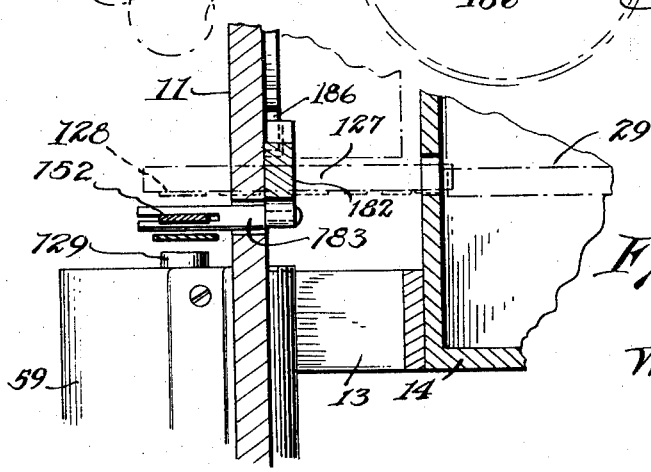
Inventors:
G. W. Janson
W. F. Callahan
Eugene C. Brown
Attorney

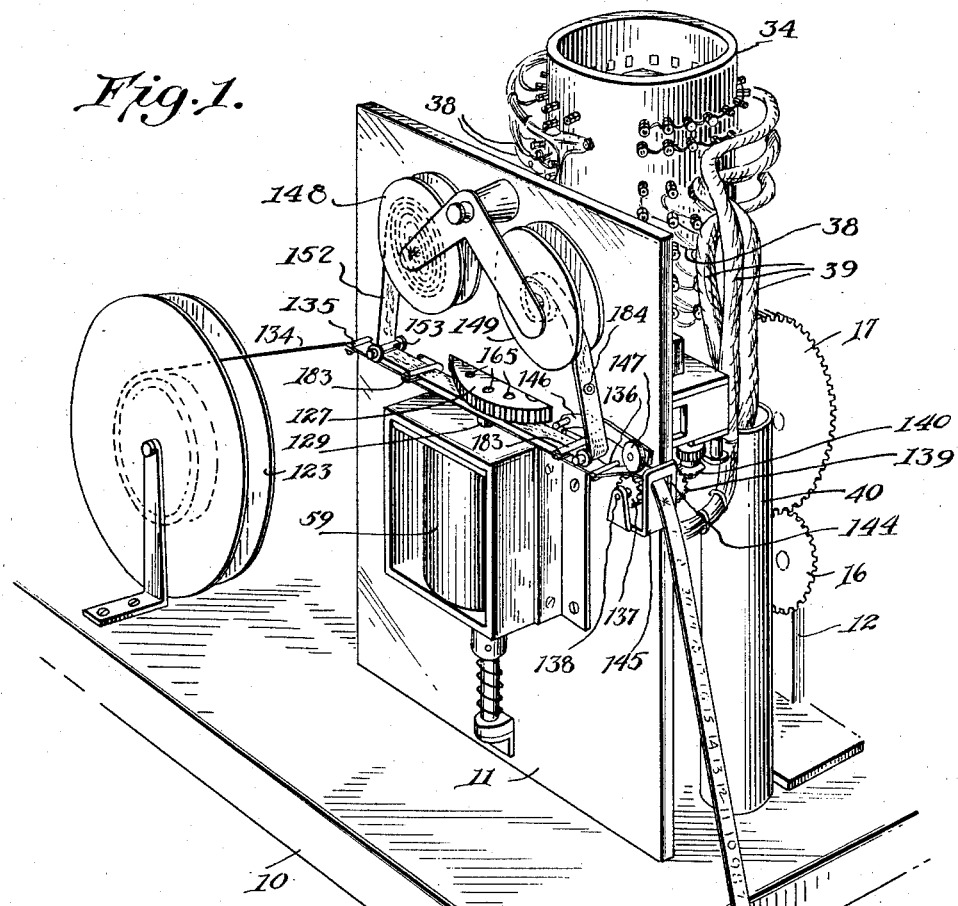

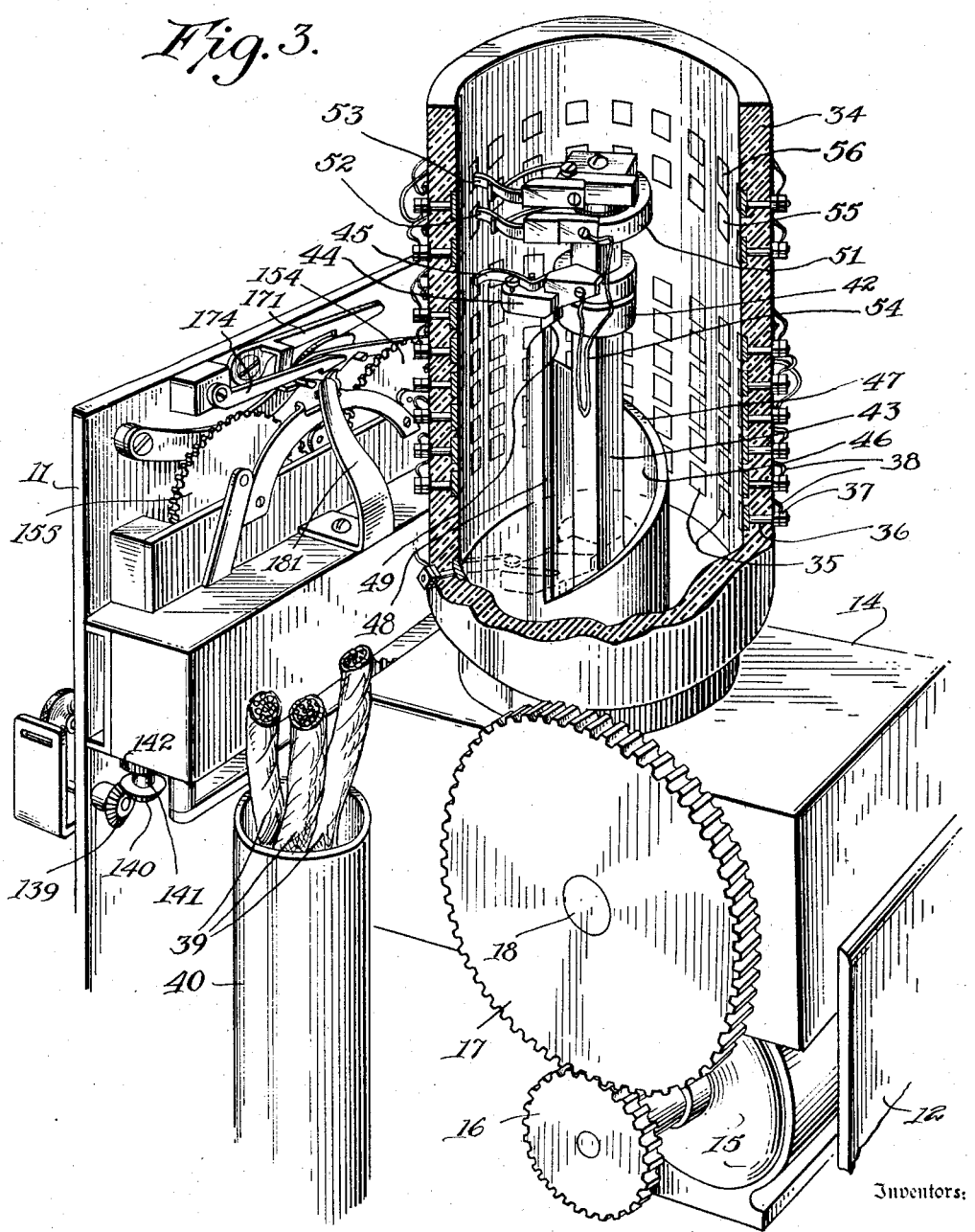

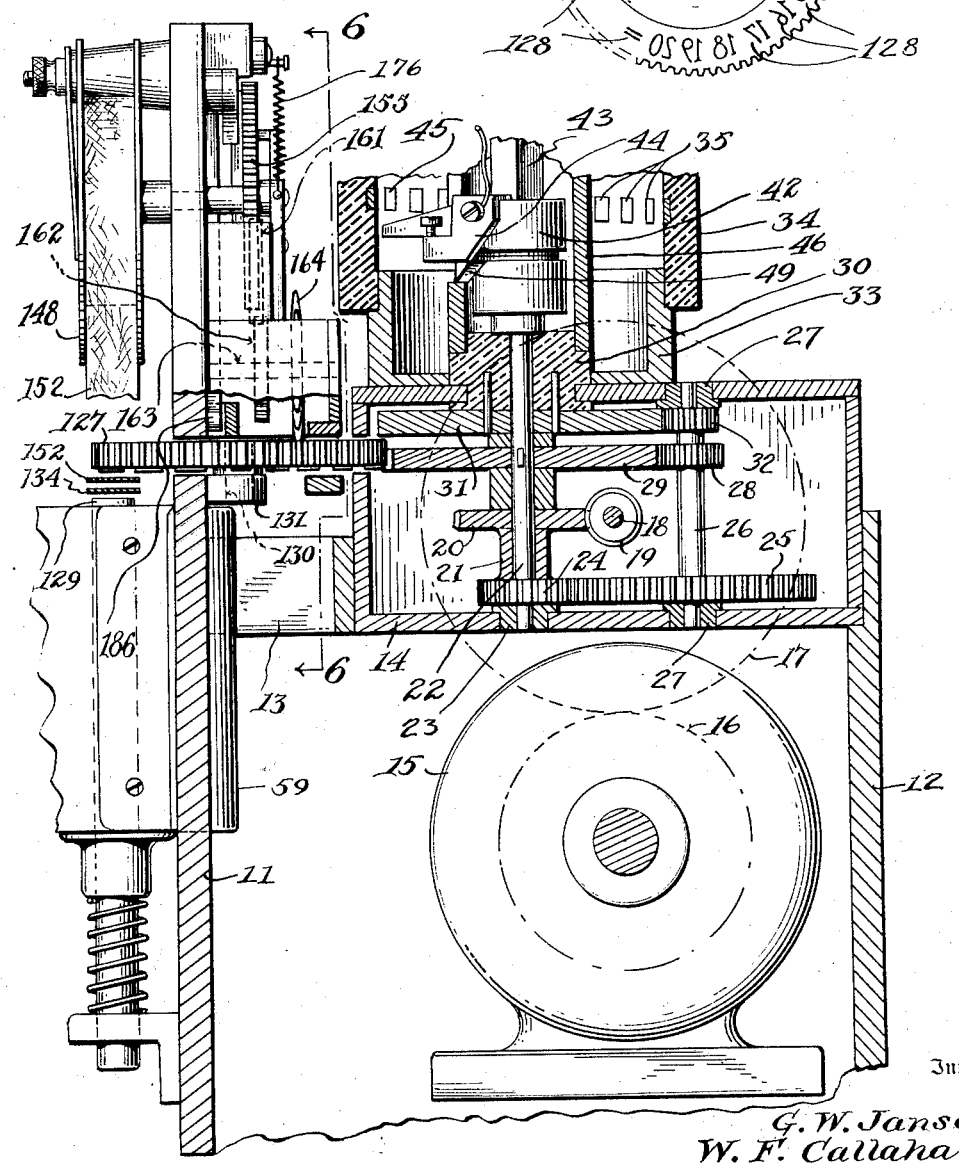

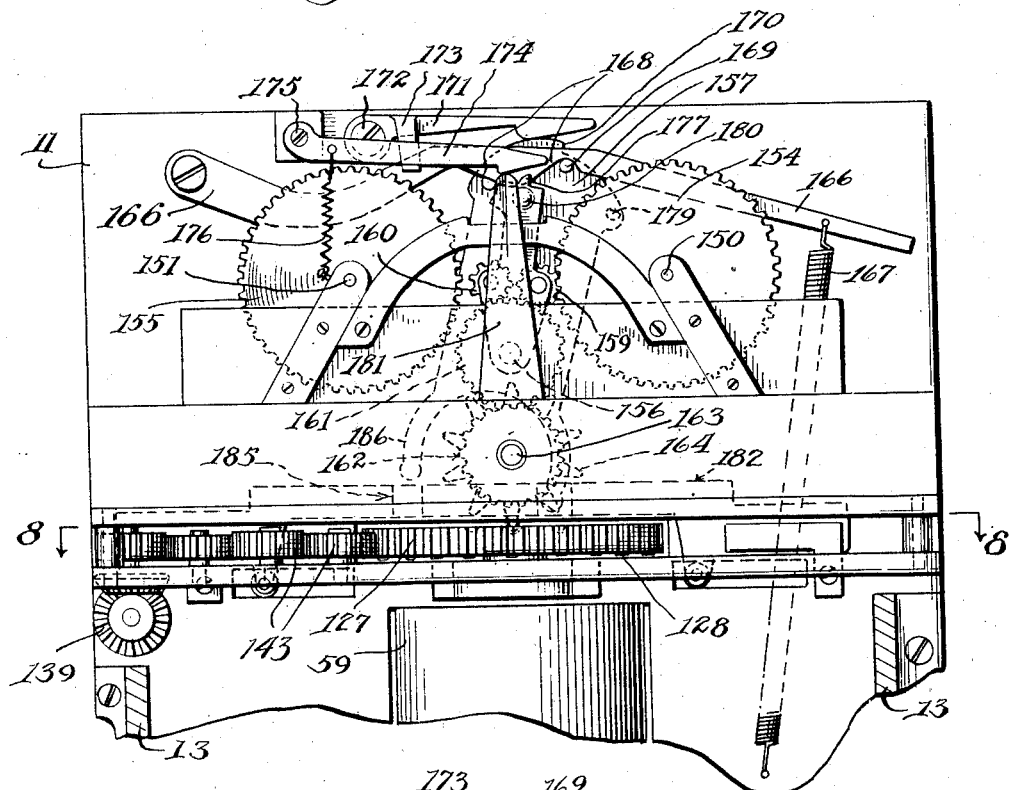

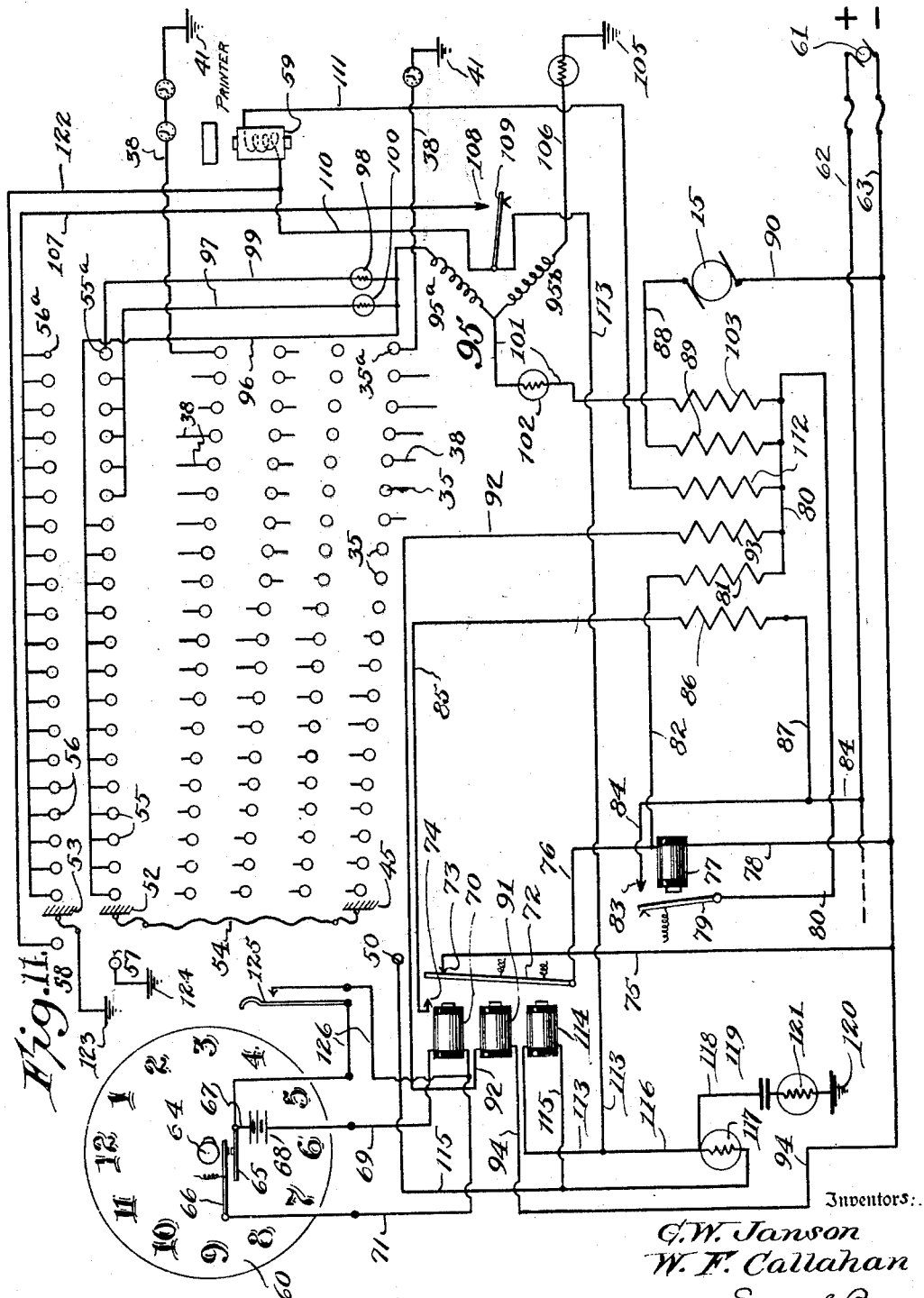

Patented Oct. 11, 1932

1,881,622

UNITED STATES PATENT OFFICE

GEORGE W. JANSON, OF NUTLEY, NEW JERSEY, AND WILLIAM F. CALLAHAN, OF BROOKLYN, NEW YORK, ASSIGNORS TO THE WESTERN UNION TELEGRAPH COMPANY, OF NEW YORK, N. Y., A CORPORATION OF NEW YORK

SYSTEM FOR TESTING AND RECORDING THE CONDITION OF CLOCK SETTING CIRCUITS

Application filed February 5, 1930. Serial No. 426,169.

This invention relates to apparatus for testing and registering circuit conditions.

It is very important, in many instances, that electric circuits should be constantly in condition to transmit current impulses and it is equally important, where a number of circuits lead from a central station and are intended for frequent use, that the condition of such circuits should be ascertained at close time intervals so that correction of improper conditions preventing the transmission of current may be made without delay. For instance, it is quite common to control a multiplicity of clocks by electrical means from a central station wherein is a master clock keeping very accurate time, this master clock controlling a plurality of circuits each of which controls one or more individual electrical clock controlling mechanisms located at remote points, such clocks being generally leased to subscribers. It is essential that the circuits between the master clock and the local clocks should remain in proper condition. It has been customary to have an employee connect a testing instrument to such circuits in succession and for him to note those circuits which are not in proper condition. This requires the constant attention of one or more employees. It is uncertain since the employee may accidentally or otherwise omit to test some of the circuits. It depends on the employee's noting the circuit which is out of order and is here again subject to error. Finally it is slow and expensive.

The main objects of the present invention are to provide an efficient automatic apparatus which will test the circuits of a series in succession; to cause such apparatus to make a printed record; to cause such apparatus to automatically record the ending of each series of tests; to arrange the apparatus so that the circuits to be tested may for testing purposes be divided into sets each including a comparatively small number; to cause the apparatus to automatically record the termination of the tests of each set; to provide a novel arrangement of motor means for operating the apparatus; to provide means for closing a circuit through the motor at spaced time intervals; to provide means for holding the circuit through the motor until all of the circuits have been tested; to provide novel means for feeding a recording tape and inking ribbon through the printing recording mechanism; and to provide means for causing the motor circuit to open and all current to be cut off until the time for the next series of tests.

With the above and other objects in view one embodiment of the invention will now be described in detail and specifically claimed, reference being had to the accompanying drawings wherein:

Figure 1 is a perspective view of the apparatus;

Figure 2 is a fragmentary detail view showing the action of the printing solenoid and type wheel;

Figure 3 is a perspective view from the right side and rear of the apparatus with certain parts omitted and others broken away to show the construction;

Figure 4 is a vertical section substantially on the median plane from front to rear of the apparatus;

Figure 5 is a bottom view of the type wheel or gear;

Figure 6 is a section on the line 6—6 of Figure 4;

Figure 7 is a view similar to Figure 6 but showing the parts in other positions;

Figure 8 is a section on the line 8—8 of Figure 6;

Figure 9 is a section on the line 9—9 of Figure 7;

Figure 10 is a detail section on the line 10—10 of Figure 9; and

Figure 11 is a wiring diagram of the apparatus.

Mounted upon a suitable table or base 10 is a front plate 11 and a rear plate 12 extending vertically in parallel spaced relation. Between these plates or standards extends a frame 13 which supports a casing 14, (see Fig. 3). Below this casing is located the driving motor 15, the shaft of which carries a gear 16, meshing with a gear 17 on a horizontal shaft 18 suitably journalled to extend through the casing 14. A worm 19 carried by the shaft 18 meshes with a worm wheel 20 formed on a sleeve 21, which is revolubly mounted on a vertical shaft 22 having its lower end supported in a bearing 23 fixed in the bottom of the casing 14. On the lower end of the sleeve 21 is formed a gear 24 which meshes with a gear 25 fixed on a vertical shaft 26, supported by bearings 27, secured in the top and bottom of the casing 14. Fixed on the shaft 26 is a pinion 28 which drives a large gear 29 keyed on the shaft 22. Thus the motor drives the shaft 22 through a reducing train. Also revolubly mounted on the shaft 22 is a sleeve 30, which is suitably journalled in the top of the casing 14. Pinned to the lower end of this sleeve is a large gear 31 which meshes with and is driven by a pinion 32 fixed on the shaft 26. It will be noted that the pinion 28 is larger than the pinion 32 and that, correspondingly, the gear 29 is smaller than the gear 31. By this means the shaft 22 is caused to revolve somewhat more rapidly than the sleeve 30 for the purpose hereinafter described. Surrounding the sleeve 30 is a cup shaped support 33 and on the upper edge of this support is rotatably mounted a hollow cylindrical sleeve or panel 34. In the lower part of the inner face of this cylindrical panel 34 is a spiral series of contacts 35 each connected to a binding post 36 which projects through the wall of the panel and carries on its outer end the securing and binding nuts 37, (see Fig. 3). By means of these posts and nuts the conductors 38 of the respective circuits to be tested are connected individually to the respective contacts 35. It has been mentioned that these contacts are arranged in a spiral on the inside of the cylindrical panel 34 and it will be noted that each convolution of the spiral contains an equal number of contacts 35 and that there are several convolutions, the corresponding contacts in successive convolutions being vertically alined. Thus the entire series of contacts are divided into sets. For instance, in the construction shown in Figure 3, six convolutions or sets are shown, while in the wiring diagram, Fig. 11, there is illustrated four sets of twenty contacts each, the remaining sets being omitted to avoid complication. The conductors 38 connected to the contacts are carried in cables 39 which pass downwardly through a conduit 40 and each conductor extending through a circuit including one or more clocks or other translating devices to ground 41 at the distant end.

Slidably mounted on the shaft 22 but arranged to rotate therewith is an insualting sleeve 42, the upper part of the shaft 22 being squared as at 43 and the sleeve 42 having a square opening therethrough to fit the squared portion 43. This sleeve carries an arm 44 which in turn carries a spring contact 45, the free end of which wipes over the contacts 35. Surrounding this sleeve is a cam cylinder 46 having its upper edge cut in the form of a spiral, as at 47, forming a single convolution having a pitch or vertical extent equal to the vertical distance between the first and last contacts 35 of the entire series of contacts. The ends of the cam edge 47 are joined by a vertical cam portion 48. The sleeve 42 carries a cam lug 49 having its under face beveled in conformity with the pitch angle of the spiral edge 47, and this lug rides on said edge. Both the shaft 22 and the cam cylinder 46 rotate in an anti-clockwise direction as the device is seen in plan but, as before stated, the shaft 22 revolves faster than the sleeve 30 which carries the cam cylinder 46. Therefore, as these two members rotate, the sleeve 42 is caused, not only to rotate but also to rise as it rotates. The difference in the speed of the rotating cam and the rotating sleeve is such that the spring contact 45 is caused to travel over the contacts 35 in a spiral path conforming to the locus of the centers of these contacts and thus to engage each one in succession. Obviously when the lug 49 passes off the upper end of the cam edge 47 the sleeve 42 will drop to its initial position at the lower end of said cam edge, being thus ready to again carry the spring contact 45 over the contacts 35. It should here be noted that the contact 45 does not engage the first of the contacts 35 when thus dropped, but is in such position that rotation of the shaft 22 and the cam cylinder move it into such engagement, However it does, at the bottom of the cam, engage a supplemental contact 50 for purposes presently to be described. It should also be borne in mind that the contacts 35 are arranged in spiral convolutions but that they are not spaced evenly over the full lengths of their convolutions, each set being spaced so that there is a greater distance between the final contact 35 of one set and the initial contact of the set next above.

At the top of the shaft portion 43 is fixed an insulating sleeve 51 which carries a lower contact 52 and an upper contact 53, these contacts being similar to the contact 45 and insulated from each other. A flexible conductor 54 connects the contacts 45 and 52 and is of proper length to permit the complete travel of the sleeve 42. The contact 52 travels over an annular series of contacts 55 and the contact 53 traverses a like series of contacts 56. These contacts are alined on the panel 34 above corresponding contacts 35 so that each time the movable contact 45 engages a contact 35, the movable contacts 52 and 53 engage respective corresponding contacts 55 and 56. Obviously the sets of contacts 55 and 56 are each equal in number to a set of the contacts 35. At the end of the series of contacts 55 and directly above the contact 50 is a supplemental contact 57, so that whenever the movable contact 45 engages the contact 50, the movable contact 52 will engage the contact 57. Also, at the end of the series of contacts 56, but closer to said end than is the contact 57 to its series, there is a supplemental contact 58, which is engaged by the movable contact 53 once upon each revolution of the shaft 22, immediately after the movable contact 45 has finished traversing a set of contacts 35.

Certain printing mechanisms will presently be described but at this time it is only necessary to mention that such mechanisms include a printing solenoid 59. Also, for the purpose of causing automatic operation of the apparatus there is provided a clock 60. Power is provided for the operation of the various functions and for the operation of the circuits 38 and of the motor from any suitable source of energy as indicated by the generator 61. The clock 60 is provided with a rotary cam member 64, driven by the clock work to revolve once in each selected time interval as, for instance, once each hour. A normally open circuit-closer having a fixed number 65 and a movable member 66 is positioned with its movable member in the path of the cam 64 so that the circuit closer is closed once in each time interval. The member 65 is connected by a conductor 67 with one terminal of a battery 68, the other terminal of the battery being connected by a conductor 69 to one terminal of the winding of the starting magnet 70. The contact 66 is connected by a conductor 71 with the other terminal of said winding. This magnet controls a conductor armature 72 normally engaging a fixed back contact 73 and moving under the influence of the magnet 70 into engagement with the front contact 74. The contact 73 is connected by a conductor 75 with the generator main 63. The armature 72 is connected by a conductor 76 with one terminal of the winding of a magnet 77 having its other terminal connected by a conductor 78 with the main 63. This magnet 77 is provided with a conductive armature 79 from which extends a conductor 80 which leads to one terminal of a resistance 81 having its other terminal connected by a conductor 82 with the conductor 76 and thus to the magnet 77. Upon energization of this magnet 77 its armature is moved into engagement with its front contact 83, connected by a conductor 84 with the positive main 62. The contact 74 is connected by a conductor 85 with one terminal of a resistance 86, its other terminal being connected by a conductor 87 with the conductor 84. One brush of the motor 15 is connected by a conductor 88 with one terminal of a resistance 89, the other terminal being connected to the conductor 80. The other brush of the motor 15 is connected by a conductor 90 with the negative main 63.

Considering the operation of the circuits thus far described, it will be seen that upon each revolution of the circuit closing cam 64, a circuit, which may be termed the clock circuit, is closed from the battery 68, through conductor 67, contact 65, contact 66, conductor 71, magnet 70 and conductor 69, back to the battery. The magnet being thus energized will cause engagement of its armature 72 with the contact 74, closing a circuit which may be called the motor relay circuit, from the main 62 through conductor 84, conductor 87, resistance 86, conductor 85, contact 74, armature 72, conductor 76, magnet 77 and conductor 78 to the negative main 63. This, in turn will energize the magnet 77 and close the motor circuit from the positive main 62 through conductor 84, contact 83, armature 79, conductor 80, resistance 89, conductor 88, motor 15 and conductor 90 to the negative main 63. At the same time a motor locking circuit will be established from the positive main 62 through conductor 84, conductor 83, armature 79, conductor 80, resistance 81, conductor 82, conductor 76, magnet 77 and conductor 78 to the negative main 63. This circuit will remain closed and the motor will operate until the armature 72 drops back against its back contact 73, at which time the motor relay closing circuit will be broken and the motor relay locking circuit will be short-circuited through the conductor 76, armature 72, contact 73 and conductor 75 to the negative main 63, thus deenergizing the magnet 77 and opening the motor circuit at the contact 83.

Upon the closing of the motor circuit as previously described, a circuit for the locking magnet 91 will be established from the positive main 62 through conductor 84, contact 83, armature 79, conductor 80, resistance 93, conductor 92, magnet 91 and conductor 94 to the negative main 63. This circuit will hold the armature 72 in contact with the contact 74 after the cam 64 has revolved sufficiently to permit opening of the clock circuit through the magnet 70.

The outside clock circuits to be tested are connected to the respective contacts 35 and are successively connected to the generator 61 through the test differential relay 95. The resistance of the relay coils 95$^a$ and 95$^b$ may differ considerably and may have a value of 125 ohms and 200 ohms respectively. The outer terminal of coil 95$^a$ is connected in parallel to conductors 96, 97 and 99 which are connected respectively to different contacts or groups of contacts 55. Suitable resistances 98 and 100 are inserted in these conductors in order to supply different voltages required for the separate conductors depending upon the lengths of the lines and the number of clocks or other translating devices in the circuit.

The outer terminal of the coil 95$^b$ is connected to ground at 105 through an artificial line which may include a resistance of say 900 ohms. The junction of the inner ends of the coils or apex is connected through conductor 101, resistance 102, which may be 1000 ohms, resistance 103, conductor 80, armature 79, and conductor 84 to the generator main 62.

The contacts 56 are connected in multiple through a conductor 107 to a fixed contact 108 in the path of the armature 109 of the differential relay. From this armature a conductor 110 leads to one terminal of the printing solenoid 59, the other terminal of this solenoid being connected by conductor 111, resistance 112, conductor 80, armature 79, and conductor 84 to the positive generator main 62. If current flows through both of these windings the armature of relay 95 is not actuated. The relay 95 being wound differential, the effect of the current flowing in winding $95^a$ will neutralize the effect of the current flowing in winding $95^b$, but if current ceases to flow through winding $95^a$ the armature will be moved away from the back contact under influence of the coil $95^b$.

From the armature 109 a conductor 113 leads to one terminal of the winding of a magnet 114 having its other terminal connected by a conductor 115 to the contact 50. The magnet 114 is of opposite polarity to that of the locking magnet 91 and thus, when energized, neutralizes the effect of the magnet 91 on the armature 72, causing the armature to fall back against its back contact 73. In order that the printer solenoid shall have time to operate before the holding magnet 91 is neutralized by the field of the magnet 114, the winding of magnet 114 is shunted by a resistance 117 and shunted by a condenser 119 and resistance 121. This occurs only at the close of the series of tests when the brush 45 engages the contact 50 and the brush 52 engages the contact 57.

The operation of the apparatus will be readily understood from the above detailed description of the several parts and their functions. The motor 15 is started upon the closing of the clock contacts 65, 66 as previously described. The rotation of the shaft 43 and cam cylinder 46 causes the brush in its lowermost position to first engage the bottom right hand contact $35^a$ in the diagram Fig. 11. At the same instant brush 52 engages contact $55^a$ and slightly later brush 53 engages contact $56^a$. This connects the first outside circuit from contact $35^a$ through brush 45, flexible conductor 54, brush 52, contact $55^a$, conductor 99, coil $95^a$ of the test differential relay, conductor 101, resistance 103, conductor 80, armature 79, and conductor 84 to generator main 62. If the circuit is in the proper condition the current which flows from generator 61 divides evenly at the apex of the differential relay between the coils $95^a$ and $95^b$ and consequently their effect is neutralized. The armature 109 therefore is not actuated but remains on the back contact. If the circuit is not in proper condition the solenoid 59 will actuate the printing mechanism to record the condition of the circuit upon a tape or other suitable record, in a manner to be described. The motor will continue to operate and cause the brushes 45, 52 and 53 to advance from one contact to the next of the set. After the first set of contacts 35 have been covered, the bottom row in the diagram, the brushes move off of the last contacts of their respective sets at the left of the diagram and the brush 53 then engages the contact 58. A circuit for the printer solenoid is thus established from positive generator main 62, through conductor 84, armature 79, conductor 80, resistance 112, conductor 111, solenoid 59, conductor 122, contact 58 and brush 53 to ground at 123. The circuit through coil $95^a$ of the differential relay 95 is open at this time. An arbitrary character is printed on the tape by the operation of the solenoid, such as the equality sign (=) indicating the end of the first set of contacts 35. In this manner the series of indications for the different rows or sets of contacts are separated by this arbitrary character printed on the tape. As the brushes c continue to revolve in the completion of the first revolution of the shaft 22, the brush 52 will engage the contact 57, but as the brush 45 has been raised by the action of the cylindrical cam 46, the brush 45 will not engage the contact 50 at this time and hence no circuit will be completed through conductor 115. The brush 45 will now advance to the first contact of the second set, the circuits connected thereto being tested as before and the special character above referred to being printed at the end of each set. It will be noted that in passing from one contact 35 to the next the circuit through the winding 95 will be broken and the differential relay will close at contact 108. If one of the circuits 38 being tested is faulty or otherwise fails to transmit current, there will be no circuit established through the winding $95^a$ upon the brush 45 engaging the corresponding contact 35 connected to the defective circuit. Consequently the armature 109 of the differential relay will be actuated and the circuit through the printer will be established between the contact 108 and the armature. It may here be noted that this printing circuit cannot ground at 120 because of the presence of the condenser 119. Since the printer operates for a defective circuit under test, the number or character corresponding to that circuit will be printed on the tape. For instance, if the fourth circuit of the set being tested is defective the number 4 will show on the tape as follows:=4 etc.=. Thus an inspection of the tape will only show on the tape the numbers corresponding to the defective circuits.

The operations above described will continue until all of the contacts 35 have been engaged by the brush 45. At this time the cam lug 49 will be near the top of the cam cylinder 46 and just as the shaft 22 completes its last revolution in causing the movement of the brush 45 over all the testing contacts 35, the cam lug 49 will pass off the spiral portion of the cam cylinder and the sleeve 42 will drop from the top to the bottom of the spiral so that the brush 45 will engage the contact 50. At the same time the brush 52 will engage the contact 57 thereby establishing a releasing circuit from the positive main 62 through conductor 84, contact 83, armature 79, conductor 80, resistance 112, conductor 111, solenoid 59, conductor 110, conductor 113, magnet 114, conductor 115, contact 50, brush 45, flexible conductor 54, brush 52 and contact 57 to ground at 124. The actuation of the printer solenoid causes another character to be recorded upon the tape to indicate the completion of the test of the circuits connected to the contacts in each of the sets. This character is represented upon the tape as an asterisk. The record of a complete test of all circuits is found on the record tape between two successive asterisks. This record is divided into the groups or sets by an arbitrary character printed between the sets, in this case, the equality sign (=). The inspector can, therefore, determine from the tape record the particular circuit or circuits that are not in proper condition.

To insure the operation of the printer solenoid before the motor circuit is broken by the armature 72, the complete energization of the neutralizing magnet 114 is retarded by connecting a resistance 117 across its terminals, shunted by a condenser 119 and resistance 121. With this arrangement the magnetic field of the neutralizing magnet cannot attain its full strength until after the charge has been built up on the condenser 119. When this occurs the field of the magnet 91 will be nullified and the armature 72 will drop back against its back stop 73, thus breaking the circuit of the motor controlling magnet 77, causing its armature 79 to open the circuit at contact 83 and stop the motor.

Provision is made for manually closing the clock circuit so that the tests may be conducted at any time without waiting for the circuit closing contact 66 to be engaged by the cam 64. To this end there is provided a manually operable circuit closer 125 connected by conductors 126 to the conductors 67 and 71.

It is to be noted that, in the embodiment here shown there are six sets of contacts 35 each containing twenty contacts. These contacts are spaced circumferentially from each other on the cylindrical panel 15° as are the contacts 55 and 56. The contact 58 is spaced 15° from the last contact 56 and the contacts 50 and 57 are spaced 30° from the contact 58 and consequently 30° from the first contact of each set, there thus being twenty-four spaces around the cylinder.

From Figures 4 and 8 it will be seen that the gear 29 meshes with a gear wheel 127. Figure 5 shows a bottom plan view of this wheel and it will there be seen that this wheel carries raised type 128, for the numbers from 1 to 20 and also having as special characters the equal sign (=) and an asterisk (*). It will also be observed that these type are spaced in accordance with the spacing of the contacts on the cylindrical panel as above noted. The solenoid 59 is secured to the standard 11 immediately below this wheel 127, which projects through a slot in said standard, so that the solenoid plunger or core 129 lies below and in alinement with the individual type corresponding to the position of the brushes 45, 52 and 53. This type wheel is carried on a shaft 130 journalled in a bearing 131 on the rear face of the standard 11. Mounted on the table or base 10 is a pair of tape reels 132 and 133, the tape 134 being wound off the reel 132 and the reel 133 being used for storing the printed tape after it has passed through the machine. On the standard 11 adjacent the reel 132 is a split guide pin 135 and spaced from the opposite edge of the standard 11 is a similar guide pin 136. These two guide pins are so positioned that the tape is guided across the upper end of the plunger 129 beneath the type wheel 127. After leaving the pin 136 the tape passes over a serrated feed roller 137 fixed on a shaft 138 which extends through the standard 11 and on the rear end of this shaft is a miter gear 139 which meshes with a miter gear 140 fixed on the lower end of a vertical shaft 141. On the upper end of the shaft 141 is a gear 142 which is connected by idler gears 143 with the gear forming the type wheel 127. After leaving the feed wheel 137 the tape passes through a slot 144 in a bracket 145 and thence downwardly for winding on the reel 133. Pivoted on the standard 11 is a lever 146 carrying a presser wheel 147 by which the tape is kept in engagement with the feed wheel at all times.

Revolubly mounted on the front of the standard 11 are the ink ribbon reels 148 and 149. These reels are mounted on shafts 150 and 151 respectively and these shafts extend through the standard 11 and project rearwardly thereof. The ink ribbon 152 is wound on these reels in the usual manner and is guided by spaced guide rollers 153 to pass between the tape 134 and the type wheel, thus lying just above said tape and in spaced relation thereto. On the shafts 150 and 151 are mounted respective gears 154 and 155. A shaft 156 is journalled to lie between the lower parts of the gears 154 and 155 and on this shaft is mounted a rocking plate 157. Also, on the shaft 156 is pivoted an arm 158 whereon is revolubly mounted a spaced pair of idlers 159 and 160 positioned for engagement with the gears 154 and 155 according to the position of the arm 158. Both of these idlers mesh with a gear 161 mounted on the shaft 156 and this gear in turn, meshes with a gear 162 fixed on a shaft 163 carrying a star wheel 164 the teeth of which engage holes 165 formed in the upper face of the type wheel 127.

Pivoted at one end on the rear face of the standard 11 is a lever 166 which extends across the rear face of the rocking plate 157 at the upper end thereof and this lever is urged downwardly at its free end by a tension spring 167. On the under side of the lever 166 is formed a pair of bevel faced notches 168 so spaced that a pin 169 projecting rearwardly from the plate 157 may engage in one or the other of these notches accordingly as the plate is rocked in one direction or the other. This arrangement serves to hold the plate 157 in fully rocked position and prevents its stopping in an intermediate position. The upper edge of the plate 157 is shaped to form a cam 170 which engages the end of a lever 171 to raise it as in Figure 6 or permit it to drop as in Figure 7. The lever 171 is pivoted by a screw 172 to the rear face of the standard 11 and carries a stirrup 173 which engages beneath a latch hook 174 pivoted as at 175 and urged downwardly by a spring 176. The hook 174 is positioned to engage a lug 177 on the upper end of arm 158, when the pinion 160 is moved into mesh with the gear 155. Projecting rearwardly from the upper end of the plate 157 are spaced pins 178 and 179 which engage respective sides of the arm 158 in accordance with the movement of the plate. A boss 180 projects from the rear of the arm 158 at the upper end thereof and rides under the V-shaped end of a leaf spring 181 so that, upon passing the center of the V-shaped end, the boss is forced away from said center, thus ensuring the proper meshing of the small gears or pinions 159 and 160 with the gears 154 and 155. A sliding bar 182 is mounted for lateral sliding movement on the standard 11 and carries split guide pins 183 which project through slots in said standard and straddle the inking ribbon 152. This tape is provided adjacent each end with a button or eyelet 184 too large to pass through the slot of the split pins 183. Notches or pockets 185 are formed in the bar 182 and receive the ends of legs 186 projecting downwardly from the rocking plate 157.

In the operation of this part of the device it may be assumed that the parts are in the position shown in Figure 7. In this position the inking ribbon is being wound on the reel 148. As the ribbon is wound off the reel 149, the button or eyelet 184 engages the split pin 183 at the left of Figs. 6 and 7 and moves the bar 182 to the right. The right hand leg 186 is at this time in its notch 185, and the movement of the bar thus starts a rocking movement of the plate 157, which is continued by the engagement of the left hand leg 185 in its notch. As the rocking movement starts, the pin 169 cams the lever 166 upwardly and passes out of the right notch 168 and enters the left notch 168. The spring 167 draws the lever down, thus forcing the pin 169 towards the bottom of the left notch and ensuring proper movement of the plate 157. Meanwhile, the pin 179 has engaged the arm 158 and started its rocking movement to force the boss 180 past the spring 181. As this boss passes the center of the spring, the action of the latter on the boss snaps the arm to the left and thus causes engagement of the pinion 160 with the gear 155, so that the movement of the ink ribbon is reversed. Also the dropping of the lever 171 by movement of the plate 157 permits the hook 174 to engage the lug 177 and locks the arm 158 in its new position, the parts now being in the positions shown in Figure 7. When the button or eyelet at the remaining end of the ink ribbon engages its split pin, the bar 182 moves to the left and the reverse action takes place, it being noted that the cam action of the plate 157 lifts the lever 171 and hook 174 to free the arm 158 for movement.

The action of the printing mechanism will now be clear since each time a circuit is tested and is defective, the solenoid 59 is energized, thus causing the solenoid core 129 to force the ink ribbon against a type character and the tape against the ink ribbon (see Figure 2), thus printing the figure or symbol of the type character on the tape, the tape and ribbon being fed along through the gearing just described so that the impressions are properly spaced.

We claim:

1. In apparatus for testing and recording conductive conditions in a series of electrical circuits, an electro-magnetically operated printing mechanism, a normally open circuit for said printing mechanism and means responsive to defective circuits operating to close said open circuit.

2. In apparatus for testing and recording conductive conditions in a series of electrical circuits, an electro-magnetically operated printing mechanism, a normally open circuit for said printing mechanism, means responsive to defective circuits operating to close said open circuit, motor means for actuating the last mentioned means, a normally open motor circuit for said motor means, and time controlled means for closing the motor circuit at predetermined time intervals.

3. In apparatus for testing and recording conductive conditions in a series of electrical circuits, an electro-magnetically operated printing mechanism, a normally open circuit for said printing mechanism, means responsive to defective circuits operating to close said open circuit, motor means for actuating the last mentioned means, a normally open motor circuit for said motor means, time controlled means for closing the motor circuit at predetermined time intervals, and other means to automatically effect opening of the motor circuit subsequent to the testing of the last of said series of circuits.

4. In apparatus for testing and recording conductive conditions in a series of electrical circuits, an electro-magnetically operated printing mechanism, a normally open circuit for said printing mechanism, means responsive to defective circuits operating to close said open circuit, and means independent of said series of circuits for closing a circuit through the printing mechanism at spaced intervals in the series of tests.

5. In apparatus for testing and recording defective conductive conditions in a series of electrical circuits, a printer, electro-magnetic means for operating the printer, a relay including a normally open circuit closer, a printer circuit connecting the circuit closer in series with the printer operating means, said relay including a winding controlling the closing of the circuit closer, and means for successively connecting each of the series of circuits to said winding.

6. In apparatus for testing and recording defective conductive conditions in a series of electrical circuits, a printer, electro-magnetic printer operating means, a relay including a normally open circuit closer, a series of contacts, electrical conductors connecting the contacts in multiple to the circuit closer and connecting the latter in series with the printer operating means, a brush traversing said series of contacts and arranged to intermittently complete a circuit through the printer operating means, and means to connect the circuits of said series successively to said relay in unison with the engagement of the brush with respective contacts.

7. In apparatus for testing and recording defective conductive conditions in a series of electrical circuits, a printer, electro-magnetic printer operating means, a relay including a normally open circuit closer, a series of contacts, electrical conductors connecting the contacts in multiple to the circuit closer and connecting the latter in series with the printer operating means, a brush traversing said series of contacts and arranged to intermittently complete a circuit through the printer operating means, means to connect the circuits of said series successively to said relay in unison with the engagement of the brush with respective contacts, a further contact in the path of said brush spaced from the last of said series of contacts, and a conductor connecting the last mentioned contact with said printer operating means to effect operation of the printer independently of the circuit closer.

8. In apparatus for testing and recording conductive conditions in a series of electrical circuits, a printer, electro-magnetic printer operating means, a relay including a normally open circuit closer, a series of contacts, electrical conductors connecting the contacts in multiple to the circuit closer and connecting the latter in series with the printer operating means, a brush traversing said series of contacts and arranged to intermittently complete a circuit through the printer operating means, a second series of contacts each having conductive connection with said relay, and equal in number to the first series of contacts, a set of contacts each connected to a respective external circuit to be tested and equal in number to the first series of contacts, bridge means for successively connecting respective contacts of the second series with corresponding contacts of the set, and means for actuating the brush and bridge means in synchronism.

9. In apparatus for testing and recording conductive conditions in a series of electrical circuits, a printer, electro-magnetic printer operating means, a relay including a normally open circuit closer, a series of contacts, electrical conductors connecting the contacts in multiple to the circuit closer and connecting the latter in series with the printer operating means, a brush traversing said series of contacts and arranged to intermittently complete a circuit through the printer operating means, a second series of contacts each having conductive connection with said relay, and equal in number to the first series of contacts, a set of contacts each connected to a respective external circuit to be tested and equal in number to the first series of contacts, bridge means for successively connecting respective contacts of the second series with corresponding contacts of the set, means for actuating the brush and bridge means in synchronism including a motor, a motor circuit, and time controlled means for effecting closing of the motor circuit at predetermined time intervals.

10. In apparatus for testing and recording conductive conditions in a series of electrical circuits, a printer, electro-magnetic printer operating means, a relay including a normally open circuit closer, a series of contacts, electrical conductors connecting the contacts in multiple to the circuit closer and connecting the latter in series with the printer operating means, a brush traversing said series of contacts and arranged to intermittently complete a circuit through the printer operating means, a second series of contacts each having conductive connection with said relay, and equal in number to the first series of contacts, a third series of contacts each connected to a respective circuit to be tested, said third series of contacts comprising a plurality of parallel sets of contacts, a second brush traversing the second series of contacts, a third brush traversing the third series of contacts and electrically connected to the second brush, and operating means for said brushes arranged to cause the brushes to traverse said first and second series of contacts and a set of the third series of contacts in unison, said operating means being further arranged to effect repetition of movement of the first and second brushes and to cause the third brush to traverse the several sets of contacts in the third series succesively.

11. In apparatus for testing and recording conductive conditions in a series of electrical circuits, a printer, electro-magnetic printer operating means, a relay including a normally open circuit closer, a series of contacts, electrical conductors connecting the contacts in multiple to the circuit closer and connecting the latter in series with the printer operating means, a brush traversing said series of contacts and arranged to intermittently complete a circuit through the printer operating means, a second series of contacts each having conductive connection with said relay, and equal in number to the first series of contacts, a third series of contacts each connected to a respective circuit to be tested, said third series of contacts comprising a plurality of parallel sets of contacts, a second brush traversing the second series of contacts, a third brush traversing the third series of contacts and electrically connected to the second brush, operating means for said brushes arranged to cause the brushes to traverse said first and second series of contacts and a set of the third series of contacts in unison, said operating means being further arranged to effect repetition of movement of the first and second brushes and to cause the third brush to traverse the several sets of contacts in the third series successively, a supplemental contact in the path of the first brush at the end of the first series of contacts and electrically connected to the printer operating means, and a pair of supplemental contacts bridged by the second and third brushes upon completion of the travel of the third brush through the third series of contacts, said pair of contacts having electrical connection with the printer operating means.

12. In a circuit testing device for testing a series of main circuits, a series of contact terminals each having a respective main circuit connected thereto, said terminals being arranged in sets, a supplemental terminal at the ends of said sets of main terminals, a supplemental circuit connected to said supplemental terminal and contact means successively engaging the main circuit terminals, said contact means being arranged to engage the supplemental terminal in passing from one set of main terminals to the next.

13. In a circuit testing device for testing a series of main circuits, a series of contact terminals each having a respective main circuit connected thereto, said terminals being arranged in sets, a supplemental terminal at the ends of said sets of main terminals, a supplemental circuit connected to said supplemental terminal, contact means successively engaging the main circuit terminals, said contact means being arranged to engage the supplemental terminal in passing from one set of main terminals to the next, a final supplemental terminal at the end of said series, and a second supplemental circuit connected to said final terminal, said contact means being arranged to engage the final terminal upon completion of its engagement with the final set of main terminals and after final engagement with the first mentioned supplemental terminal.

14. In apparatus for testing and recording circuit conditions in a series of circuits, an electro-magnetically operated printer, a normally open printing circuit therethrough, circuit closing means arranged for closing circuits successively through the series of circuits to be tested and thereby intermittently closing said printing circuit, a motor driving said circuit closing means, a normally open motor circuit, a relay for closing said motor circuit and including an operating magnet, time controlled means for temporarily closing a circuit through said magnet, a locking circuit for said relay operable to hold the relay closed upon opening of the time controlled circuit, and means controlled by said first circuit closing means for effecting short circuiting of the locking circuit upon completion of the series of tests.

15. In apparatus for testing and recording circuit conditions in a series of circuits, an electro-magnetically operated printer, a normally open printing circuit therethrough, circuit closing means arranged for closing circuits successively through the series of circuits to be tested and thereby intermittently closing said printing circuit, a motor driving said circuit closing means, a normally open motor circuit, a relay for closing said motor circuit and including an operating magnet, a normally open-circuited second relay for closing a circuit through the first relay and including a circuit closing magnet, a circuit through the second relay and including a normally open circuit closer, a clock arranged to close the last mentioned circuit closer temporarily at spaced time intervals, a locking magnet in said second relay for holding the same closed, a normally open circuit for the locking magnet closed by the closing of the first relay, a neutralizing magnet for the second relay arranged to neutralize the field of the locking magnet, a normally open circuit through said neutralizing magnet, and means controlled by the first circuit closing means for closing the neutralizing magnet circuit upon completion of the tests of the series of circuits to be tested.

16. In apparatus for testing and recording conductive conditions in a series of circuits, a recording device comprising a movable record tape, an inking ribbon associated with said tape, a rotatable type wheel bearing type characters each indicating a specific circuit, a printing solenoid positioned to cause engagement of the ribbon with a type character on the wheel and the tape with the ribbon upon energization thereof, a circuit closer arranged to successively close circuits through the series of circuits and thereby cause intermittent energization of said solenoid, a motor, and means operatively connecting the motor to the type wheel and to the circuit closer to operate the wheel and circuit closer in unison.

17. In apparatus for testing and recording conductive conditions in a series of circuits, a recording device comprising a movable record tape, an inking ribbon associated with said tape, a rotatable type wheel bearing type characters each indicating a specific circuit, a printing solenoid positioned to cause engagement of the ribbon with a type character on the wheel and the tape with the ribbon upon energization thereof, a circuit closer arranged to successively close circuits through the series of circuits and thereby cause intermittent energization of said solenoid, a motor, means operatively connecting the motor to the type wheel and to the circuit closer to operate the wheel and circuit closer in unison, means to close a supplemental circuit through said solenoid after circuits have been closed through all the circuits under test, and a supplemental type character on said wheel positioned for printing upon closing of the supplemental circuit.

18. In apparatus for testing and recording conductive conditions in a series of circuits forming a plurality of sets, a recording device comprising a movable record tape, an inking ribbon associated with said tape, a rotatable type wheel bearing type characters each indicating a specific circuit, a printing solenoid positioned to cause engagement of the ribbon with a type character on the wheel and the tape with the ribbon upon energization thereof, a circuit closer arranged to successively close circuits through the series of circuits and thereby indicate defective circuits upon energization of said solenoid, a motor, means operatively connecting the motor to the type wheel and to the circuit closer to operate the wheel and circuit closer in unison, means to close a supplemental circuit through said solenoid after circuits have been closed through all the circuits under test, a supplemental type character on said wheel positioned for printing upon closing of the supplemental circuit, other means to close a second supplemental circuit through said solenoid upon completion of the tests of each set of circuits to be tested, and a second supplemental type character on said wheel positioned for printing upon closing of the second supplemental circuit.

In testimony whereof we affix our signatures.

GEORGE W. JANSON.
WILLIAM F. CALLAHAN.